(12) United States Patent
Stjernberg et al.

(10) Patent No.: US 12,092,007 B2
(45) Date of Patent: Sep. 17, 2024

(54) COMPUTER-IMPLEMENTED METHOD FOR CONTROLLING A REGENERATION EVENT

(71) Applicant: VOLVO TRUCK CORPORATION, Gothenburg (SE)

(72) Inventors: Oscar Stjernberg, Gothenburg (SE); Martin Wilhelmsson, Torslanda (SE); Johan Bjernetun, Mölnlycke (SE); Anders Eriksson, Torslanda (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 18/427,943

(22) Filed: Jan. 31, 2024

(65) Prior Publication Data
US 2024/0254904 A1    Aug. 1, 2024

(30) Foreign Application Priority Data

Feb. 1, 2023  (EP) ..................... 23154531

(51) Int. Cl.
*F01N 3/02* (2006.01)
*F01N 3/023* (2006.01)

(52) U.S. Cl.
CPC ........ *F01N 3/023* (2013.01); *F01N 2900/102* (2013.01)

(58) Field of Classification Search
CPC .......... F01N 3/023; F01N 3/035; F01N 3/021; F01N 3/0233; F01N 3/08; F01N 3/0821; F01N 3/0885; F01N 3/031; F01N 3/032; F01N 9/00; F01N 9/002; F01N 11/00; F01N 11/002; F01N 2900/102; F01N 2900/1606; F01N 2900/0422; F01N 2900/0402; F01N 2900/0404; F01N 2900/0406; F01N 2900/0408; F01N 2900/0411; F01N 2900/0412; F01N 2900/0414; F01N 2900/0416; F01N 2900/0418; F01N 2900/0421; F01N 2260/04; F01N 2510/06; F01N 2410/04; F02D 41/029; F02D 41/0245; F02D 41/025; F02D 41/0055;
(Continued)

(56) References Cited

U.S. PATENT DOCUMENTS 9,182,764 B1 * 11/2015 Kolhouse ............... G01C 21/34
9,732,646 B2 * 8/2017 Upadhyay ............. F01N 3/0232
(Continued)

FOREIGN PATENT DOCUMENTS

DE   102019205132 A1   10/2020

OTHER PUBLICATIONS

Extended European Search Report in corresponding European Application No. 23154531.0 dated Oct. 20, 2023 (10 pages).

*Primary Examiner* — Dapinder Singh
(74) *Attorney, Agent, or Firm* — Venable LLP; Jeffri A. Kaminski

(57) ABSTRACT

A computer-implemented method for controlling a regeneration event for an exhaust aftertreatment system of a vehicle is described. The method comprises predicting, by a processor device, expected travelling times for travelling from a starting point to a first destination point and from an auxiliary point to a second destination point based on collected drive time statistical data and collected additional drive time statistical data; and controlling, by the processor device, the regeneration event based on the predicted expected travelling times.

16 Claims, 4 Drawing Sheets

(58) Field of Classification Search
CPC .. F02D 2200/0812; Y02T 10/12; Y02T 10/40;
Y02A 50/20
See application file for complete search history.

(56) References Cited

U.S. PATENT DOCUMENTS

| | | | |
|---|---|---|---|
| 10,677,122 B2* | 6/2020 | Martin | F01N 9/002 |
| 10,961,893 B2* | 3/2021 | Hendrickson | F01N 3/0296 |
| 11,339,730 B2* | 5/2022 | Maier | F02D 41/0025 |
| 2014/0081563 A1 | 3/2014 | Wang et al. | |
| 2016/0201533 A1 | 7/2016 | Upadhyay et al. | |
| 2017/0115666 A1* | 4/2017 | Kolhouse | G08G 1/017 |
| 2018/0340784 A1 | 11/2018 | Upadhyay et al. | |

\* cited by examiner

COMPUTER-IMPLEMENTED METHOD FOR CONTROLLING A REGENERATION EVENT

TECHNICAL FIELD

The disclosure relates generally to control of a vehicle. In particular aspects, the disclosure relates to computer-implemented method for controlling a regeneration event for an exhaust aftertreatment system (EATS) of a vehicle. The disclosure also relates to a computer system, a vehicle, a computer program product, a control system and a non-transitory computer-readable medium. The disclosure can be applied in heavy-duty vehicles, such as trucks, buses, and construction equipment. Although the disclosure may be described with respect to a particular vehicle, the disclosure is not restricted to any particular vehicle.

BACKGROUND

Vehicles which use combustion engines for propulsion may be equipped with an exhaust aftertreatment system (EATS). An EATS may during use require to undergo a regeneration event, also denoted aftertreatment regeneration. Aftertreatment regeneration is sometimes needed to for example improve on the NOx conversion performance, to reduce the amount of urea crystal build up or to reduce the level of soot collected in a particulate filter of the EATS. The regeneration event may be performed during driving, and it may be planned so that there is a high probability to finalize the event before the vehicle reaches its final destination where the vehicle may be shutdown. Even though there are systems for planning a regeneration event, such as by use of a navigation system of the vehicle, there is still a strive to develop improved technology relating to controlling a regeneration event of an EATS.

SUMMARY

According to a first aspect of the disclosure, there is provided a computer system for controlling a regeneration event for an exhaust aftertreatment system (EATS) of a vehicle. The computer system comprises a processor device which is configured to:
collect drive time statistical data for a vehicle driving cycle during driving of the vehicle, wherein the vehicle driving cycle is associated with a starting point and a first travelling direction from the starting point;
determine a most probable path of the vehicle driving cycle which is associated with the starting point and the first travelling direction, wherein the most probable path is a path between the starting point and a first destination point;
during driving along the most probable path, determine if the vehicle departs from the most probable path at an auxiliary point along the most probable path;
in response to determining that the vehicle departs from the most probable path, collect additional vehicle drive time statistical data for an auxiliary path of the vehicle driving cycle, wherein the additional vehicle drive time statistical data uses the auxiliary point and an auxiliary travelling direction from the auxiliary point as reference for the auxiliary path, wherein the auxiliary path is a path between the auxiliary point and a second destination point;
predict expected travelling times for travelling from the starting point to the first destination point and from the auxiliary point to the second destination point based on the collected drive time statistical data and the collected additional drive time statistical data; and
control the regeneration event based on the predicted expected travelling times.

The first aspect of the disclosure may seek to improve the control of a regeneration event. A technical benefit may include that the expected travelling times for the vehicle may be predicted in an efficient manner with a high accuracy, and/or without a need of manual input from a user, e.g., a driver of the vehicle. Thereby, improved automatic decisions relating to the control of the regeneration event may be made. For example, by the provision of the present disclosure, a successful regeneration event may be achieved with higher probability by use of the predicted expected travelling times. This may in turn provide lower fuel consumption, higher emission robustness and reduced impact on driving performance.

According to a second aspect of the disclosure, there is provided a computer-implemented method for controlling a regeneration event for an exhaust aftertreatment system of a vehicle. The method comprises:
collecting, by a processor device of a computer system, vehicle drive time statistical data for a vehicle driving cycle during driving of the vehicle, wherein the vehicle driving cycle is associated with a starting point and a first travelling direction from the starting point;
determining, by the processor device, a most probable path of the vehicle driving cycle which is associated with the starting point and the first travelling direction, wherein the most probable path is a path between the starting point and a first destination point;
during driving along the most probable path, determining, by the processor device, if the vehicle departs from the most probable path at an auxiliary point along the most probable path;
in response to determining that the vehicle departs from the most probable path, collecting, by the processor device, additional vehicle drive time statistical data for an auxiliary path of the vehicle driving cycle, wherein the additional vehicle drive time statistical data uses the auxiliary point and an auxiliary travelling direction from the auxiliary point as reference for the auxiliary path, wherein the auxiliary path is a path between the auxiliary point and a second destination point;
predicting, by the processor device, expected travelling times for travelling from the starting point to the first destination point and from the auxiliary point to the second destination point based on the collected drive time statistical data and the collected additional drive time statistical data; and
controlling, by the processor device, the regeneration event based on the predicted expected travelling times.

The second aspect of the disclosure may also seek to improve the control of a regeneration event. A technical benefit may include that the expected travelling times for the vehicle may be predicted in an efficient manner with a high accuracy, and/or without need of manual input from a user, e.g., a driver of the vehicle. Thereby, improved automatic decisions relating to the control of the regeneration event may be made. For example, by the provision of the present disclosure, a successful regeneration event may be achieved with higher probability by use of the predicted expected travelling times. This may in turn provide lower fuel consumption, higher emission robustness and reduced impact on driving performance.

In some examples, the method is performed on-board the vehicle. A technical benefit may include that the method may be performed by use of data from the vehicle, and by less data from remote entities, such as data from other vehicles. Accordingly, the expected travelling times may be predicted on-board the vehicle with high accuracy by use of less external information. Thereby, a more efficient control may be achieved, implying faster prediction and/or reduced cost.

In some examples, the method may further comprise:
predicting, by the processor device, expected travelling times for travelling from the starting point to the auxiliary point and/or from the auxiliary point to the first destination point based on the collected drive time statistical data; and
controlling, by the processor device, the regeneration event based on the predicted expected travelling times. A technical benefit may include that the control of the regeneration event can be further improved, since the vehicle driving cycle is split into more driving segments, defined by the starting point, the auxiliary point, the first destination point and the second destination point, and wherein each driving segment is associated with a predicted expected travelling time. In particular, the most probable path will be split into at least two driving segments by use of the auxiliary point, thereby allowing the regeneration event to be controlled also based on the at least two driving segments of the most probable path.

In some examples, controlling the regeneration event based on the predicted expected travelling times comprises:
in response to determining a need for performing a regeneration event of the exhaust aftertreatment system, initiating the regeneration event when it is also determined that the vehicle is driving along a section of the vehicle driving cycle which is associated with a predicted expected travelling time which fulfils a first criterion. The first criterion may be a predetermined criterion. The first criterion may be associated with a required time period for performing the regeneration event. A technical benefit may include that the regeneration event is initiated when there is enough time for finalizing the regeneration event, thereby preventing any unnecessary stops/interruptions of the regeneration event.

In some examples, controlling the regeneration event based on the predicted expected travelling times comprises:
in response to determining that a regeneration event of the exhaust aftertreatment system is ongoing, aborting the regeneration event when it is also determined that the vehicle is driving along a section of the vehicle driving cycle which is associated with a predicted expected travelling time which fulfils a second criterion. The second criterion may be a predetermined criterion. The second criterion may be associated with a required time for finalizing the ongoing regeneration event. A technical benefit may include that the ongoing regeneration event is aborted when there is not enough time for finalizing the regeneration event, thereby preventing any unnecessary continuation of the ongoing regeneration event.

In some examples, aborting the regeneration event comprises initiating a controlled stop of the regeneration event. A technical benefit may include that the risk of damaging components of the exhaust aftertreatment system is mitigated. A controlled stop may be defined as a stop in which the regeneration event is aborted by a sequence of actions, and not, e.g., by instantly aborting the complete regeneration event by one action, such as by instantly switching off the power required for running the regeneration event, or by instantly stopping the control of the regeneration event by the processor device.

In some examples, the method further comprises:
determining, by the processor device, that the vehicle is driving along a section of the driving cycle which is associated with a predicted expected travelling time by detecting a current position and/or travelling direction of the vehicle. A technical benefit may include that the processor device may thereby be able to make more informed decisions about when to initiate and/or abort a regeneration event. For example, detecting a current position and/or travelling direction of the vehicle may be performed by use of any one or a combination of a global navigation satellite system (GNSS), environmental perception sensor(s) of the vehicle, and vehicle-to-anything (V2X) communication. In some examples, information about current position, travelling direction and/or vehicle speed of the vehicle is/are the only external data used by the method, i.e., data which emanates from outside the vehicle. This implies an efficient, fast and cost-effective method for controlling a regeneration event. Other data used by the method, which may be denoted internal data, i.e. data generated on-board the vehicle, may be vehicle speed and/or data relating to a need for performing a regeneration event.

In some examples, a start and/or an end of the vehicle driving cycle is defined by use of position data and a value being indicative of vehicle speed and/or vehicle propulsion power. A technical benefit may include an improved estimation of the start and/or end of the vehicle driving cycle, which preferably is performed onboard the vehicle. A start of the vehicle driving cycle may for example be noted when the value being indicative of vehicle speed and/or vehicle propulsion power exceeds a threshold. An end of the vehicle driving cycle may for example be noted when the value being indicative of vehicle speed and/or vehicle propulsion power is below a threshold.

In some examples, the method further comprises:
determining, by the processor device, when the vehicle temporarily departs from the most probable path; and
in response to determining that the vehicle temporarily departs from the most probable path, controlling the regeneration event based on the predicted expected travelling times which are associated with the most probable path. A technical benefit may include that the regeneration event is controlled based on the predicted expected travelling times which are associated with the most probable path, and not based on the departure from the most probable path, e.g., by unnecessarily aborting the regeneration event. Temporarily departing from the most probable path may mean that the vehicle departs at a point along the most probable path which is not an auxiliary point associated with an auxiliary path as disclosed herein. Temporarily departing from the most probable path may additionally or alternatively mean that the vehicle is only determined to be outside of the most probable path for a limited time period defined by a threshold.

In some examples, determining when the vehicle temporarily departs from the most probable path comprises detecting that the departure from the most probable path relates to a temporary obstacle on the most probable path, such as a temporary obstacle caused by an accident or construction work. For example, the temporary obstacle may be detected by use of any one or a combination of GNSS, environmental perception sensor(s) of the vehicle, and vehicle-to-anything (V2X) communication.

In some examples, the expected travelling times are updated based on live traffic data. A technical benefit may include that the prediction of the expected travelling times is further improved, e.g., by also using information about traffic congestion along the driving path.

According to a third aspect of the disclosure, there is provided a vehicle comprising a processor device which is configured to perform a method according to any one of the examples of the second aspect of the disclosure. Additionally, or alternatively, the vehicle may comprise a computer system according to the first aspect of the disclosure. Advantages and effects of the third aspect of the disclosure are analogous to the advantages and effects of the first and second aspects of the disclosure.

According to a fourth aspect of the disclosure, there is provided a computer program product comprising program code for performing, when executed by a processor device, the method of any of the examples of the second aspect of the disclosure. Advantages and effects of the fourth aspect of the disclosure are analogous to the advantages and effects of the first and second aspects of the disclosure.

According to a fifth aspect of the disclosure, there is provided a control system comprising one or more control units configured to perform the method of any of the examples of the second aspect of the disclosure. Advantages and effects of the fifth aspect of the disclosure are analogous to the advantages and effects of the first and second aspects of the disclosure.

According to a sixth aspect of the disclosure, there is provided a non-transitory computer-readable storage medium comprising instructions, which when executed by a processor device, cause the processor device to perform the method of any of the examples of the second aspect of the disclosure. Advantages and effects of the sixth aspect of the disclosure are analogous to the advantages and effects of the first and second aspects of the disclosure.

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein. There are also disclosed herein control units, computer readable media, and computer program products associated with the above discussed technical benefits.

BRIEF DESCRIPTION OF THE DRAWINGS

With reference to the appended drawings, below follows a more detailed description of aspects of the disclosure cited as examples.

DETAILED DESCRIPTION

Aspects set forth below represent the necessary information to enable those skilled in the art to practice the disclosure.

The present disclosure may seek to improve the control of a regeneration event of an exhaust aftertreatment system (EATS). An EATS is typically used for reducing harmful exhaust emissions from an internal combustion engine, such as a diesel engine. The EATS may for example comprise one or more catalysts, a diesel particulate filter, means for reducing NOx levels in the emission gas, etc. When reducing the harmful exhaust emissions, deposits can form throughout the EATS. The deposits may be formed by operation of the aforementioned particulate filter and/or by leftover byproducts of the reduction process. The deposits typically reduce the efficiency of the EATS. Therefore, regular removal of these deposits is beneficial to maintaining the EATS performance. These removal events may be referred to as regeneration events. For example, a regeneration event may comprise heating exhaust gases and/or components in the EATS to a temperature so that particulates are burnt off components in the EATS.

A regeneration event typically continues for a period of time and may be performed during driving of the vehicle. Once a regeneration event has started, it may be disadvantageous to abort the event before it is finalized. For example, aborting the regeneration event before it is finalized may lead to unnecessary waste of energy, it may damage the EATS, etc. Therefore, it may be beneficial to control the regeneration event so that it is not terminated too early.

A technical benefit of the present disclosure may include that expected travelling times for the vehicle may be predicted in an efficient manner with a high accuracy, and/or without a need of manual input from a user, e.g., a driver of the vehicle. For example, by the present disclosure, expected travelling times may be predicted in an efficient manner without the need of providing information about the final destination of the vehicle. Thereby, improved automatic decisions relating to the control of the regeneration event may be made. For example, by the provision of the present disclosure, a successful regeneration event may be achieved with higher probability by use of the predicted expected travelling times. This may in turn provide lower fuel consumption, higher emission robustness and reduced impact on driving performance.

Figure 1:
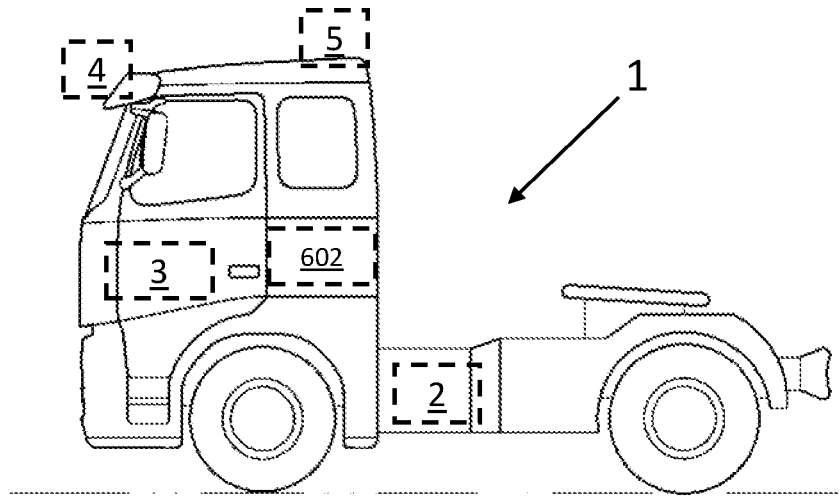
FIG. 1 is an exemplary side view of a vehicle according to one example.

FIG. 1 depicts a side view of a vehicle 1 according to an example. The vehicle 1 is here a truck, more specifically a heavy-duty truck for towing one or more trailers (not shown). Even though a heavy-duty truck 1 is shown it shall be noted that the disclosure is not limited to this type of vehicle but may be used for any other type of vehicle, such as a bus, construction equipment, e.g. a wheel loader or an excavator, or a passenger car.

The vehicle 1 comprises a processor device 602, which also may be denoted a processing circuitry and/or a control unit, which is configured to perform a method as disclosed herein. The vehicle 1 further comprises an EATS 2. The EATS 2 is configured to be subjected to a regeneration event, whereby the regeneration event is controlled by use of the processor device 602. The processor device 602 may comprise processing circuitry which is adapted to run a computer program. The processor device 602 may comprise hardware and/or software for controlling the regeneration event. In some examples, the processor device 602 may be denoted a computer. The processor device 602 may be constituted by one or more separate sub-processor devices. In addition, the processor device 602 may communicate with other entities by use of wired and/or wireless communication means.

Figure 2:
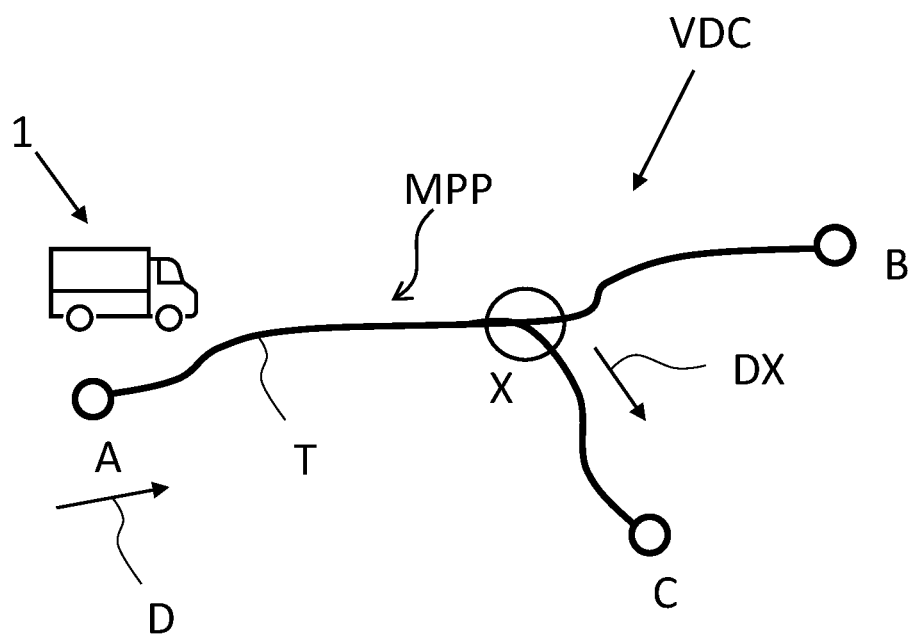
FIG. 2 is an exemplary schematic illustration of a vehicle travelling along a driving path according to one example.

FIG. 2 depicts a schematic illustration of a vehicle 1 travelling along a driving path T according to one example. The vehicle 1 may for example be the vehicle 1 as shown in FIG. 1. In the shown example, the vehicle 1 is driving from a starting point A to a first destination point B. The path between A and B is in this example defined as a most probable path MPP for the vehicle 1 when it starts driving from the starting point A in a first travelling direction D from the starting point A. The driving path T forms part of a vehicle driving cycle VDC for the vehicle 1, wherein the vehicle driving cycle VDC is associated with the starting point A and the first travelling direction D from the starting point A, e.g., it may be determined that the vehicle 1 is about to drive according to the vehicle driving cycle VDC when the vehicle 1 starts driving from the starting point A in the first travelling direction D from the starting point A. In the example shown in FIG. 2, the vehicle driving cycle VDC comprises driving from the starting point A to the first destination point B or from the starting point A to a second destination point C. Accordingly, when the vehicle 1 starts driving from the starting point A in the first travelling direction D, it may not be known, except to e.g. the driver, if the vehicle 1 will drive to the first destination point B or to the second destination point C. To determine when the vehicle 1 drives according to the vehicle driving cycle VDC and/or along the most probable path MPP, a current position and/or travelling direction of the vehicle 1 may be used. Current position and/or travelling direction of the vehicle 1 may be detected by use of any one or a combination of a global navigation satellite system (GNSS) 3, at least one environmental perception sensor 4 of the vehicle 1, and vehicle-to-anything (V2X) communication 5.

A most probable path may herein be defined as a path most frequently travelled by a vehicle when starting from a starting point in a specific travelling direction. Accordingly, in the example shown in FIG. 2, the most probable path MPP is the most frequently travelled path MPP travelled by the vehicle 1 when starting from the starting point A in the first travelling direction D. As such, in this example, the path from the starting point A to the second destination point C is a less frequently travelled path.

Figure 3:
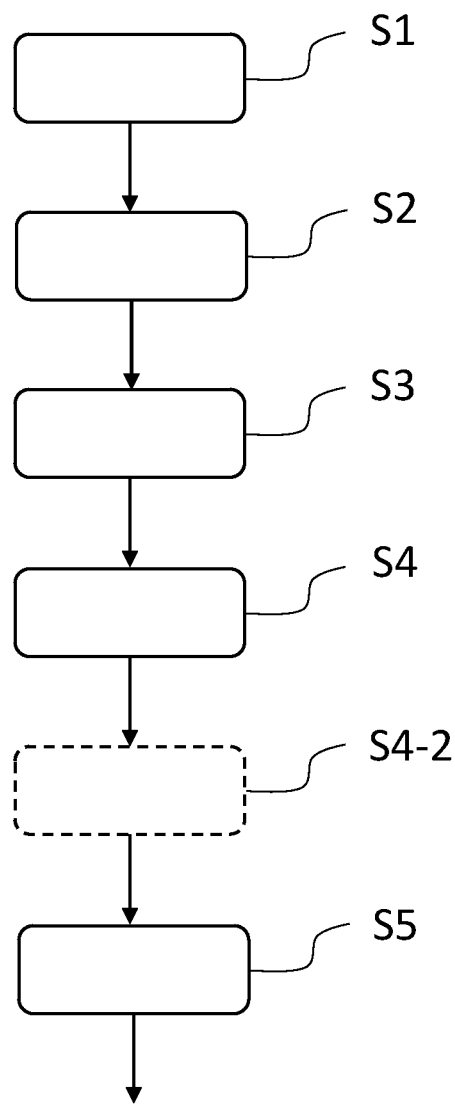
FIG. 3 is an exemplary flowchart of a method according to one example.

FIG. 3 depicts a flowchart of a computer-implemented method according to an example of the present disclosure. Accordingly, FIG. 3 depicts an example of a computer-implemented method for controlling a regeneration event for an EATS 2 of a vehicle 1. With reference to especially FIGS. 1-3, the method comprises:

collecting S1, by a processor device 602 of a computer system 600, vehicle drive time statistical data for a vehicle driving cycle VDC during driving of the vehicle 1, wherein the vehicle driving cycle VDC is associated with a starting point A and a first travelling direction D from the starting point A. An example of the computer system 600 will be described in the below with reference to FIG. 6. The vehicle drive time statistical data may typically be collected during frequent driving of the vehicle 1. Additionally, or alternatively, the vehicle drive time statistical data may be collected during driving simulation of the vehicle 1. This implies a faster collection of drive time statistical data. Drive time may herein be defined as a time required for driving a specific path.

The method further comprises:
determining S2, by the processor device 602, a most probable path MPP of the vehicle driving cycle VDC which is associated with the starting point A and the first travelling direction D, wherein the most probable path MPP is a path between the starting point A and a first destination point B.

The method further comprises:
during driving along the most probable path MPP, determining S3, by the processor device 602, if the vehicle 1 departs from the most probable path MPP at an auxiliary point X along the most probable path MPP. Determining if the vehicle 1 departs from the most probable path MPP at the auxiliary point X along the most probable path MPP may for example be made by use of any one or a combination of the above-mentioned GNSS 3, environmental perception sensor 4, and V2X communication 5.

The method further comprises:
in response to determining that the vehicle 1 departs from the most probable path MPP, collecting S3, by the processor device 602, additional vehicle drive time statistical data for an auxiliary path X-C of the vehicle driving cycle VDC, wherein the additional vehicle drive time statistical data uses the auxiliary point X and an auxiliary travelling direction DX from the auxiliary point X as reference for the auxiliary path X-C, wherein the auxiliary path X-C is a path between the auxiliary point X and a second destination point C.

The method further comprises:
predicting S4, by the processor device 602, expected travelling times for travelling from the starting point A to the first destination point B and from the auxiliary point X to the second destination point C based on the collected drive time statistical data and the collected additional drive time statistical data; and controlling S5, by the processor device 602, the regeneration event based on the predicted expected travelling times. Accordingly, the regeneration event is controlled during driving of the vehicle 1.

The method may, as intimated in the above, be performed on-board the vehicle 1, i.e. by the processor device 602 and e.g., by use of any one of the GNSS 3, the environmental perception sensor(s) 4, and the V2X communication 5. For example, the environmental perception sensor(s) 4 may be used for localizing the vehicle 1 with respect to a reference, e.g., a map. In a similar vein, the GNSS 3 may be used for localizing the vehicle 1 with respect to a reference, e.g., a map, and also the V2X communication 5 may receive data for localizing the vehicle 1 with respect to a reference, e.g., a map. The map may be predetermined and/or recorded during driving, such as by use of a SLAM (simultaneous localizing and mapping) algorithm. The environmental perception sensor(s) 4 may be any or a combination of camera(s), LIDAR (light detection and ranging) sensor(s), RADAR (radio detection and ranging) sensor(s), SONAR (sound navigation and ranging) sensor(s), and/or ultrasonic sensor(s).

The method may further comprise:
predicting S4-2, by the processor device 602, expected travelling times for travelling from the starting point A to the auxiliary point X and/or from the auxiliary point X to the first destination point B based on the collected drive time statistical data; and controlling S5, by the processor device 602, the regeneration event based on the predicted expected travelling times. S4-2 is optional as indicated by a box with dashed lines in FIG. 3.

Figure 4:
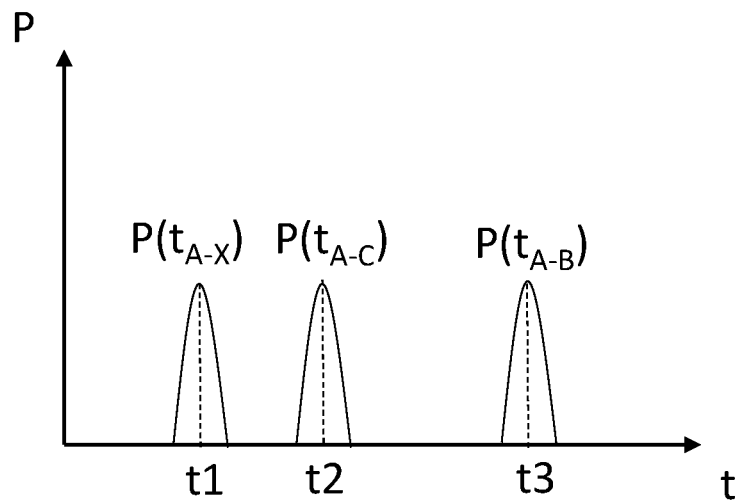
FIG. 4 is an exemplary graph illustrating a probability density as a function of travelling time according to one example.

FIG. 4 depicts a graph representing a probability density P as a function of travelling time t according to one example. Accordingly, the probability density of a travelling time for driving from A to X may be expressed as $P(t_{A-X})$, the probability density of a travelling time for driving from A to C may be expressed as $P(t_{A-C})$, and the probability density of a travelling time for driving from A to B may be expressed as $P(t_{A-B})$. By use of the present disclosure, i.e., by collecting drive time statistical data and additional drive time statistical data as disclosed herein, a statistical distribution of travelling times for travelling between at least A-B, X-C, A-X and A-C will be obtained. Thereby, a small, or narrow, statistical distribution of the travelling times will be achieved. Accordingly, the accuracy of the prediction of the expected travelling times can be made with a high confidence. The times t1, t2 and t3 as shown in FIG. 4 represent the average time for driving from A-X, A-C, and A-B, respectively. These average times t1, t2, t3 may represent at least some of the predicted expected travelling times as disclosed herein.

Controlling S5 the regeneration event based on the predicted expected travelling times may comprise:
in response to determining a need for performing a regeneration event of the EATS 2, initiating the regeneration event when it is also determined that the vehicle 1 is driving along a section of the vehicle driving cycle VDC which is associated with a predicted expected travelling time which fulfils a first criterion. For example, the first criterion may be set to a time required for performing the regeneration event, and when the predicted expected travelling time is equal to or longer than the first criterion, the regeneration event may be initiated.

Controlling S5 the regeneration event based on the predicted expected travelling times may additionally or alternatively comprise:
in response to determining that a regeneration event of the EATS 2 is ongoing, aborting the regeneration event when it is also determined that the vehicle 1 is driving along a section of the vehicle driving cycle VDC which is associated with a predicted expected travelling time which fulfils a second criterion. For example, the second criterion may be associated with a time required for finalizing the regeneration event. When it is determined that the regeneration event cannot be finalized in time, the regeneration event may be aborted.

Aborting the regeneration event may comprise initiating a controlled stop of the regeneration event. Thereby, a risk of damaging the EATS 2 or any other components of the vehicle 1 may be reduced.

The method may further comprise:
determining, by the processor device 602, that the vehicle 1 is driving along a section of the vehicle driving cycle VDC which is associated with a predicted expected travelling time by detecting a current position and/or travelling direction of the vehicle 1. Accordingly, this may be done by any one of a combination of the aforementioned GNSS 3, environmental perception sensor(s) 4, and the V2X communication 5.

Figure 5:
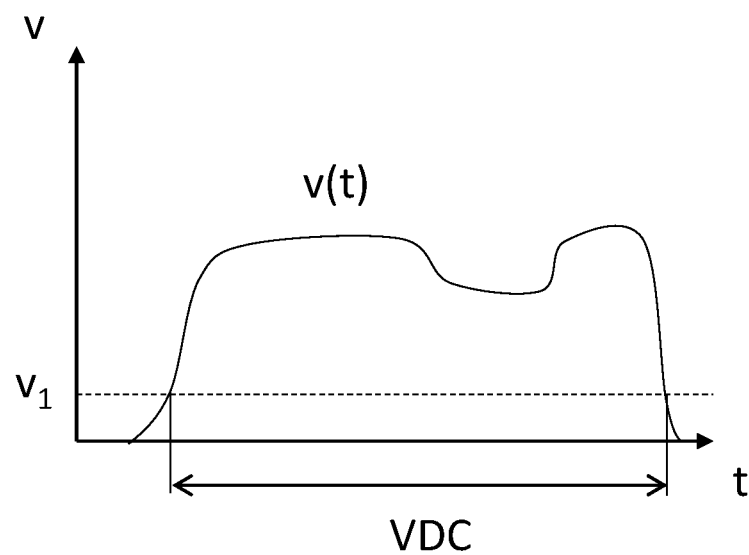
FIG. 5 is an exemplary graph illustrating vehicle speed as a function of time according to one example.

A start and/or an end of the vehicle driving cycle VDC may be defined by use of position data and a value being indicative of vehicle speed v and/or vehicle propulsion power. In this respect it is referred to FIG. 5 which depicts a graph representing vehicle speed v as a function of time, e.g., expressed as v(t). The time for the vehicle driving cycle VDC may thus be defined by a threshold value v1 for vehicle speed v. The threshold value v1 may for example be set to a value of 0-5 km/h. Accordingly, by way of example, when the vehicle speed v exceeds 0-5 km/h it may be determined that the vehicle driving cycle VDC starts, and/or when the vehicle speed v is equal to or falls below 0-5 km/h, it may be determined that the vehicle driving cycle VDC ends. Accordingly, the collection of vehicle drive time statistical data may comprise a collection of time periods based on the time from when the vehicle drive cycle VDC starts until it ends, defined by the threshold value v1. In some examples, shorter stops, such as stopping at a traffic light, may be regarded as temporary stops, and not as an end of the vehicle driving cycle VDC.

The method may further comprise:
determining, by the processor device 602, when the vehicle 1 temporarily departs from the most probable path MPP; and
in response to determining that the vehicle 1 temporarily departs from the most probable path MPP, controlling the regeneration event based on the predicted expected travelling times which are associated with the most probable path MPP. Thereby, for example, an unnecessary termination of the regeneration event may be avoided. Determining when the vehicle 1 temporarily departs from the most probable path MPP may comprise detecting that the departure from the most probable path MPP relates to a temporary obstacle on the most probable path MPP, such as a temporary obstacle caused by an accident or construction work.

The expected travelling times, e.g. t1, t2 and t3, may be updated based on live traffic data. Thereby, a further improved prediction of the travelling times may be achieved.

Figure 6:
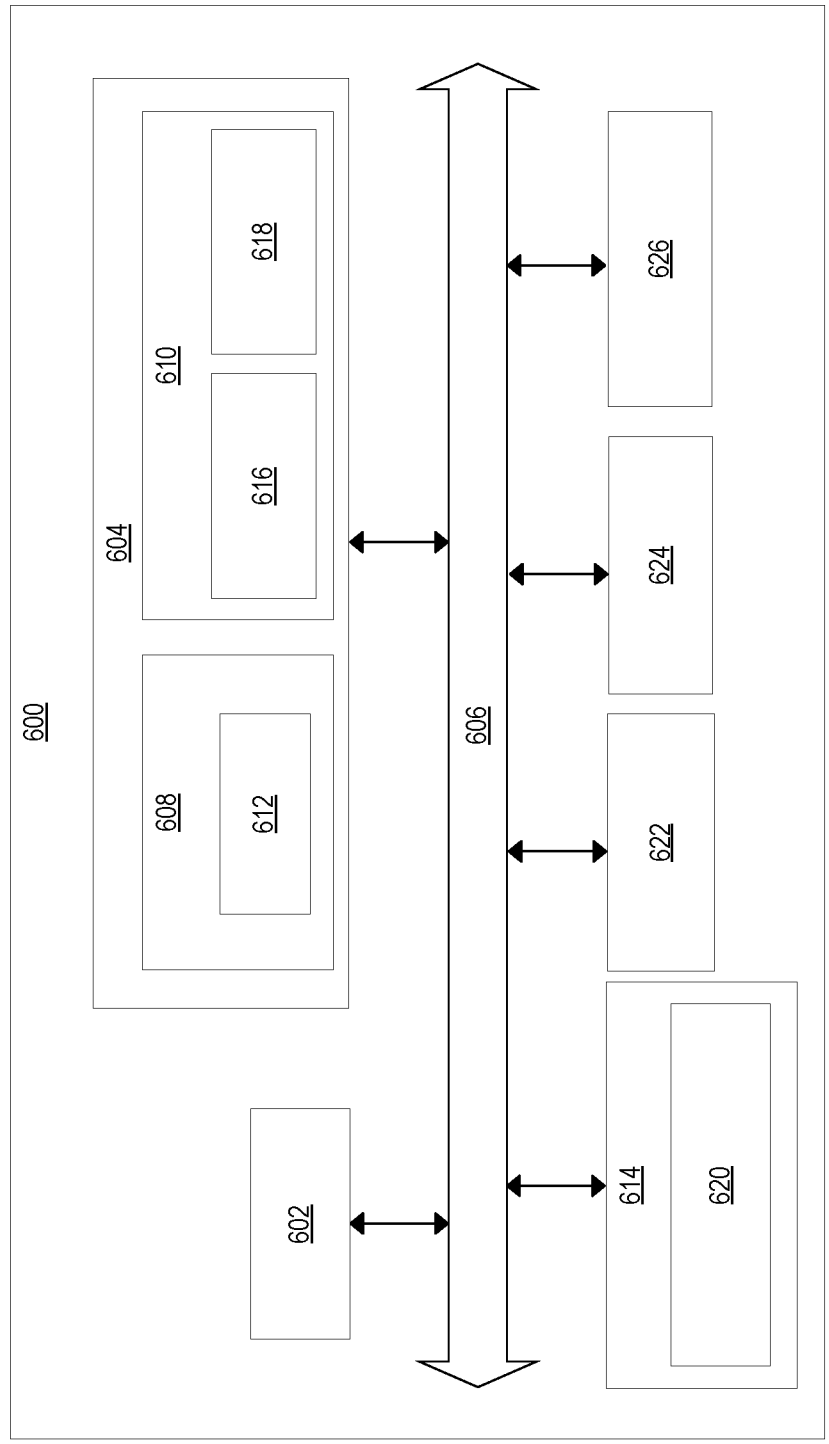
FIG. 6 is a schematic diagram of an exemplary computer system for implementing examples disclosed herein, according to one example.

The disclosure also relates to a computer system 600 for controlling a regeneration event for an EATS 2 of a vehicle 1, see FIG. 6 which depicts an example of the computer system 600. The computer system 600 comprises a processor device 602 which is configured to:
collect drive time statistical data for a vehicle driving cycle VDC during driving of the vehicle 1, wherein the vehicle driving cycle VDC is associated with a starting point A and a first travelling direction D from the starting point A;
determine a most probable path MPP of the vehicle driving cycle VDC which is associated with the starting point A and the first travelling direction D, wherein the most probable path MPP is a path between the starting point A and a first destination point B;
during driving along the most probable path MPP, determine if the vehicle 1 departs from the most probable path MPP at an auxiliary point X along the most probable path MPP;
in response to determining that the vehicle 1 departs from the most probable path MPP, collect additional vehicle drive time statistical data for an auxiliary path X-C of the vehicle driving cycle VDC, wherein the additional vehicle drive time statistical data uses the auxiliary point X and an auxiliary travelling direction DX from the auxiliary point X as reference for the auxiliary path X-C, wherein the auxiliary path X-C is a path between the auxiliary point X and a second destination point (C);
predict expected travelling times for travelling from the starting point A to the first destination point B and from the auxiliary point X to the second destination point C based on the collected drive time statistical data and the collected additional drive time statistical data; and control the regeneration event based on the predicted expected travelling times.

FIG. 6 is a schematic diagram of a computer system 600 for implementing examples disclosed herein. The computer system 600 is adapted to execute instructions from a computer-readable medium to perform these and/or any of the functions or processing described herein. The computer system 600 may be connected (e.g., networked) to other machines in a LAN, an intranet, an extranet, or the Internet. While only a single device is illustrated, the computer system 600 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 600 may comprise at least one computing device or electronic device capable of including firmware, hardware, and/or executing software instructions to implement the functionality described herein. The computer system 600 may include a processor device 602 (may also be referred to as a control unit), a memory 604, and a system bus 606. The computer system 600 may include at least one computing device having the processor device 602. The system bus 606 provides an interface for system components including, but not limited to, the memory 604 and the processor device 602. The processor device 602 may include any number of hardware components for conducting data or signal processing or for executing computer code stored in memory 604. The processor device 602 (e.g., control unit) may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processor device may further include computer executable code that controls operation of the programmable device.

The system bus 606 may be any of several types of bus structures that may further interconnect to a memory bus (with or without a memory controller), a peripheral bus, and/or a local bus using any of a variety of bus architectures. The memory 604 may be one or more devices for storing data and/or computer code for completing or facilitating methods described herein. The memory 604 may include database components, object code components, script components, or other types of information structure for supporting the various activities herein. Any distributed or local memory device may be utilized with the systems and methods of this description. The memory 604 may be communicably connected to the processor device 602 (e.g., via a circuit or any other wired, wireless, or network connection) and may include computer code for executing one or more processes described herein. The memory 604 may include non-volatile memory 608 (e.g., read-only memory (ROM), erasable programmable read-only memory (EPROM), electrically erasable programmable read-only memory (EEPROM), etc., and volatile memory 610 (e.g., random-access memory (RAM), or any other medium which can be used to carry or store desired program code in the form of machine-executable instructions or data structures and which can be accessed by a computer or other machine with a processor device 602. A basic input/output system (BIOS) 612 may be stored in the non-volatile memory 608 and can include the basic routines that help to transfer information between elements within the computer system 600.

The computer system 600 may further include or be coupled to a non-transitory computer-readable storage medium such as the storage device 614, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 614 and other drives associated with computer-readable media and computer-usable media may provide non-volatile storage of data, data structures, computer-executable instructions, and the like.

A number of modules can be implemented as software and/or hard-coded in circuitry to implement the functionality described herein in whole or in part. The modules may be stored in the storage device 614 and/or in the volatile memory 610, which may include an operating system 616 and/or one or more program modules 618. All or a portion of the examples disclosed herein may be implemented as a computer program product 620 stored on a transitory or non-transitory computer-usable or computer-readable storage medium (e.g., single medium or multiple media), such as the storage device 614, which includes complex programming instructions (e.g., complex computer-readable program code) to cause the processor device 602 to carry out the steps described herein. Thus, the computer-readable program code can comprise software instructions for implementing the functionality of the examples described herein when executed by the processor device 602. The processor device 602 may serve as a controller or control system for the computer system 600 that is to implement the functionality described herein.

The computer system 600 also may include an input device interface 622 (e.g., input device interface and/or output device interface). The input device interface 622 may be configured to receive input and selections to be communicated to the computer system 600 when executing instructions, such as from a keyboard, mouse, touch-sensitive surface, etc. Such input devices may be connected to the processor device 602 through the input device interface 622 coupled to the system bus 606 but can be connected through other interfaces such as a parallel port, an Institute of Electrical and Electronic Engineers (IEEE) 1394 serial port, a Universal Serial Bus (USB) port, an IR interface, and the like. The computer system 600 may include an output device interface 624 configured to forward output, such as to a display, a video display unit (e.g., a liquid crystal display (LCD) or a cathode ray tube (CRT)). The computer system

600 may also include a communications interface 626 suitable for communicating with a network as appropriate or desired.

The operational steps described in any of the exemplary aspects herein are described to provide examples and discussion. The steps may be performed by hardware components, may be embodied in machine-executable instructions to cause a processor to perform the steps, or may be performed by a combination of hardware and software. Although a specific order of method steps may be shown or described, the order of the steps may differ. In addition, two or more steps may be performed concurrently or with partial concurrence.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

What is claimed is:

1. A computer system for controlling a regeneration event for an exhaust aftertreatment system of a vehicle, the computer system comprising a processor device which is configured to:
    collect drive time statistical data for a vehicle driving cycle during driving of the vehicle, wherein the vehicle driving cycle is associated with a starting point and a first travelling direction from the starting point;
    determine a most probable path of the vehicle driving cycle which is associated with the starting point and the first travelling direction, wherein the most probable path is a path between the starting point and a first destination point;
    during driving along the most probable path, determine if the vehicle departs from the most probable path at an auxiliary point along the most probable path;
    in response to determining that the vehicle departs from the most probable path, collect additional vehicle drive time statistical data for an auxiliary path of the vehicle driving cycle, wherein the additional vehicle drive time statistical data uses the auxiliary point and an auxiliary travelling direction from the auxiliary point as reference for the auxiliary path, wherein the auxiliary path is a path between the auxiliary point and a second destination point;
    predict expected travelling times for travelling from the starting point to the first destination point and from the auxiliary point to the second destination point based on the collected drive time statistical data and the collected additional drive time statistical data; and
    control the regeneration event based on the predicted expected travelling times.

2. A computer-implemented method for controlling a regeneration event for an exhaust aftertreatment system of a vehicle, the method comprising:
    collecting, by a processor device of a computer system, vehicle drive time statistical data for a vehicle driving cycle during driving of the vehicle, wherein the vehicle driving cycle is associated with a starting point and a first travelling direction from the starting point;
    determining, by the processor device, a most probable path of the vehicle driving cycle which is associated with the starting point and the first travelling direction, wherein the most probable path is a path between the starting point and a first destination point;
    during driving along the most probable path, determining, by the processor device, if the vehicle departs from the most probable path at an auxiliary point along the most probable path;
    in response to determining that the vehicle departs from the most probable path, collecting, by the processor device, additional vehicle drive time statistical data for an auxiliary path of the vehicle driving cycle, wherein the additional vehicle drive time statistical data uses the auxiliary point and an auxiliary travelling direction from the auxiliary point as reference for the auxiliary path, wherein the auxiliary path is a path between the auxiliary point and a second destination point;
    predicting, by the processor device, expected travelling times for travelling from the starting point to the first destination point and from the auxiliary point to the second destination point based on the collected drive time statistical data and the collected additional drive time statistical data; and
    controlling, by the processor device, the regeneration event based on the predicted expected travelling times.

3. The method according to claim 2, wherein the method is performed on-board the vehicle.

4. The method according to claim 2, further comprising:
predicting, by the processor device, expected travelling times for travelling from the starting point to the auxiliary point and/or from the auxiliary point to the first destination point based on the collected drive time statistical data; and controlling, by the processor device, the regeneration event based on the predicted expected travelling times.

5. The method according to claim 2, wherein controlling the regeneration event based on the predicted expected travelling times comprises:
in response to determining a need for performing a regeneration event of the exhaust aftertreatment system, initiating the regeneration event when it is also determined that the vehicle is driving along a section of the vehicle driving cycle which is associated with a predicted expected travelling time which fulfils a first criterion.

6. The method according to claim 2, wherein controlling the regeneration event based on the predicted expected travelling times comprises:
in response to determining that a regeneration event of the exhaust aftertreatment system is ongoing, aborting the regeneration event when it is also determined that the vehicle is driving along a section of the vehicle driving cycle which is associated with a predicted expected travelling time which fulfils a second criterion.

7. The method according to claim 6, wherein aborting the regeneration event comprises initiating a controlled stop of the regeneration event.

8. The method according to claim 2, further comprising:
determining, by the processor device, that the vehicle is driving along a section of the vehicle driving cycle which is associated with a predicted expected travelling time by detecting a current position and/or travelling direction of the vehicle.

9. The method according to claim 2, wherein a start and/or an end of the vehicle driving cycle is defined by use of position data and a value being indicative of vehicle speed and/or vehicle propulsion power.

10. The method according to claim 2, further comprising:
determining, by the processor device, when the vehicle temporarily departs from the most probable path; and
in response to determining that the vehicle temporarily departs from the most probable path, controlling the regeneration event based on the predicted expected travelling times which are associated with the most probable path.

11. The method according to claim 10, wherein determining when the vehicle temporarily departs from the most probable path comprises detecting that the departure from the most probable path relates to a temporary obstacle on the most probable path, such as a temporary obstacle caused by an accident or construction work.

12. The method according to claim 2, wherein the expected travelling times are updated based on live traffic data.

13. A vehicle comprising a processor device which is configured to perform a method according to claim 2.

14. A computer program product comprising program code for performing, when executed by a processor device, the method of claim 2.

15. A control system comprising one or more control units configured to perform the method of claim 2.

16. A non-transitory computer-readable storage medium comprising instructions, which when executed by a processor device, cause the processor device to perform the method of claim 2.

* * * * *